United States Patent Office 3,313,793
Patented Apr. 11, 1967

3,313,793
PROCESS FOR MOLECULAR WEIGHT REDUCTION OF DIENE POLYMERS
Harold E. De LaMare, El Cerrito, Calif., and David B. Todd, Park Ridge, Ill., assignors to Shell Oil Company, New York, N.Y., a corporation of Delaware
No Drawing. Filed July 16, 1964, Ser. No. 383,217
10 Claims. (Cl. 260—94.7)

This invention relates to a new process for polymer degradation. More particularly, it is concerned with the reduction of average molecular weights of diene polymers and copolymers.

Synthetic polymers of conjugated dienes, including both homopolymers and copolymers of conjugated dienes with vinyl arenes such as styrene, have been produced by a number of well-known methods which results in products having most of the beneficial properties of natural rubber and avoiding many of the disadvantages due to the impurities which occur in the natural product. However, the products obtained to date inherently embody certain disadvantages which may be largely attributed to the relatively lower cis 1,4-content of the synthetic polymers or to the mono-dispersed (narrow molecular weight) character of the product, both of which affect the physical properties. For example, products may be obtained by several synthetic processes having a cis 1,4-content between 85 and 97%, but these have been found to have certain disadvantages relative to their processing quality. Emulsion-produced polymers, on the other hand, are characterized in many instances by their relatively lower cis 1,4-content, even though their molecular weight spread is substantially greater.

The spectrum of molecular weights which exists in the usual solution-produced synthetic polyisoprene and polybutadiene appears to peak much more sharply than that of natural rubber. This, in addition to the differences in cis 1,4-content also contributes to the difficulty experienced during processing of these synthetic rubbers. The insignificant content of the low molecular weight polyisopropene or polybutadiene fraction in the synthetic products results in a product which is excessively stiff and unyielding. This in turn causes difficulties with respect to incorporation of rubber compounding ingredients such as carbon black, sulfur, pigments, zinc oxide, stearic acid and the like.

Low molecular weight conjugated diene polymers may be produced by solution methods more fully described hereinafter. By the utilization of excessively large proportions of catalysts, the molecular weight of these products is within the low range desired, but due to the high catalyst content of the polymerization charge, it is often difficult to control the reaction and, more importantly, the cis 1,4-content of low molecular weight polymers so produced is undesirably low compared with polymers made with the same catalyst and diene monomer but a lower ratio of catalyst to monomer.

It is an object of the present invention to improve the preparation of low molecular weight conjugated diene polymers. It is a particular object of the invention to provide a process for the production of low molecular weight diene polymers having relatively high cis 1,4-content. It is a further object of the invention to provide a low molecular weight polymer derived from high molecular weight polymers wherein the stereoconfiguration of the low molecular weight product is essentially the same as that of the high molecular weight diene polymer from which it was derived. Other objects will become apparent during the following detailed description of the invention.

Now, in accordance with the present invention, an improved process for the production of relatively low molecular weight polymers of conjugated dienes having a pre-determined stereoconfiguration is provided which comprises the following steps:

(1) forming a solution of the conjugated diene polymer having an originally high average molecular weight in a non-hydrogen-donating (e.g., an inert) solvent;

(2) combining therewith between about 0.1 and 5% by weight each, based on the polymer, of certain peroxides as defined further hereinafter and a copper source of the groups consisting of copper, copper halides and copper carboxylates; the molar ratio of peroxide to copper source being between about 2 and 50; the weight of copper source being calculated as copper metal;

(3) heating the mixture so formed for 1–24 hours at 25–100° C. in the substantial absence of oxygen ($O_2$);

(4) and recovering a conjugated diene polymer product having a substantially reduced average molecular weight, the stereoconfiguration of the product being essentially the same as that of the original high molecular weight conjugated diene prior to the peroxide-copper treatment.

Preferably, the process comprises heating a high molecular weight polymer of a conjugated diene having from 4–8 carbon atoms per molecule in an aromatic hydrocarbon solvent for a period of time between about 2 and 12 hours at a preferred temperature of 50–85° C. in the substantial absence of atmospheric oxygen or its equivalent, and in the presence of 0.25–1.5% by weight of an alkyl hydroperoxide and of a cupric salt (calculated as Cu) of an aliphatic carboxylic acid as a preferred class of copper source.

The process of the invention has the unexpected primary virtue of complete control over the stereoconfiguration of the product in addition to close control over the reduction in molecular weight thereof. This is contrasted to prior known processes for molecular weight reduction or for the production of low molecular weight polymers in the first place wherein an undesirable stereoconfiguration was obtained and/or an uncontrolled isomerization took place during the molecular weight reduction process resulting in a low molecular weight product but one having an undesired stereoconfiguration.

The high molecular weight elastomers from which the low molecular weight counterparts are prepared by the process of this invention may be either homopolymers or copolymers of conjugated dienes. Homopolymers having from 4–8 carbon atoms per molecule are especially preferred and of these, isoprene and butadiene are particularly contemplated.

The process by which the high molecular weight materials are synthesized is not an essential part of the present invention. Primarily, however, since a high cis 1,4-content is usually regarded as desirable, the elastomers are prepared by synthetic processes which will promote this stereoconfiguration. For example, solution processes involving lithium based catalysts may be employed. In this method, the catalyst comprises lithium metal, an alkyl lithium or other lithium compounds as described in the literature. All of these result in the formation of synthetic polyisoprenes having a cis 1,4-content in the order of 90–98%.

Lithium alkyls are especially preferred for this purpose and include particularly those having up to 8 carbon atoms per alkyl radical. Secondary alkyl lithiums are preferred due to certain advantages gained in the reduction in overall polymerization time as compared with the use of normal alkyl lithiums. Typical catalysts in this category are secondary butyl lithium, secondary amyl lithium and the like, although the corresponding normal alkyl lithiums may be utilized.

Polymerization is normally conducted at temperatures in the order of −20 to about 100° C. preferably between 20 and 65° C. The proportion of catalysts is usually maintained at a relatively low level in order to promote a correspondingly high cis 1,4-content. Because of this, the polymers produced may have an undesirably high molecular weight.

The elastomers may also be prepared by polymerization in the presence of a Ziegler type catalyst. Such catalysts normally comprise reaction products of heavy metal compounds with aluminum compounds either with or without a cobalt or nickel halide such as cobalt chloride. The metal compound is that of a metal of Group IVB, VB or VIB of the Periodic Table including particularly titanium, zirconium, and vanadium. Titanium tetrachloride is the most preferred species. The aluminum compound is preferably an aluminum alkyl or aluminum alkyl halide. Polymerization is usually conducted at temperatures between about 0 and 80° C. for a period of time between about ½ and 10 hours.

Polybutadiene may be prepared by known methods including catalysts such as cobaltous or nickel halides combined with aluminum alkyl halides and water. Reaction media may include inert hydrocarbons such as monoolefins and/or aromatics, utilizing the action times varying from 15 minutes to 8 hours at 0–100° C.

The high molecular weight conjugated diene polymers usually have intrinsic viscosities between about 3 and 16 dl./g. in toluene measured at 25° C. The first stage in the present process comprises forming a cement (solution) of the conjugated diene high molecular weight polymer in a solvent therefore, such solvent being one which does not donate hydrogen in the presence of the peroxide and copper compounds under the treatment conditions. Such solvents include especially aromatic hydrocarbons, chlorinated aromatics, and perhalocarbons as well as mixtures thereof. Suitable solvents include particularly benzene, chlorobenzene, naphthalene, perchloroethylene, perchoropropylene and the like. The concentration of high molecular weight polymer in the solvent will depend upon the viscosity of the solution so prepared and upon the efficiency and power of the mixing apparatus employed in carrying out the process. Preferably, the solutions should contain between about 2 and 10% by weight of high molecular weight polymer at the start of the process.

The second stage of the process of the invention comprises mixing with the solution a peroxide and a copper source each present in the amount between 0.1 and 5% by weight based on the weight of the high molecular weight elastomer, the weight of copper source being calculated as metallic copper. Five principal classes of peroxides are contemplated falling within the generic structural formula as follows:

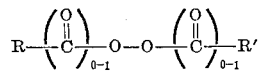

In the above formula, R is a hydrocarbyl radical and R' is a radical of the group consisting of hydrogen and hydrocarbyl. The five principal classes meeting the above structural formula include per esters, hydroperoxides, per acids, dialkylperoxides and diacylperoxides. The following species are typical of these various classes of peroxides:

Peresters
  t-butyl perbenzoate
  t-butyl peracetate
  sec-butyl perbenzoate
  sec-butyl perpropionate
  isopropyl perbutyrate
Peracids
  peracetic acid
  perpropionic acid
  perbenzoic acid
  per-t-butyric acid
  perstearic acid Hydroperoxides
  t-butyl hydroperoxide
  n-propyl hydroperoxide
  sec-amyl hydroperoxide
  sec-hexyl hydroperoxide
  n-octyl hydroperoxide
Dialkyl peroxides
  di(n-butyl)peroxide
  di(t-butyl)peroxide
  di(t-amyl)peroxide
  n-butyl-t-butyl peroxide
  isopropyl-t-butyl peroxide Diacyl peroxides
  dibenzoyl peroxide
  dipropionyl peroxide
  mixed di($C_{9-15}$ acyl) peroxides The preferred classes meeting the above general formula are: peresters, particularly tertiary butyl perbenzoate and alkyl hydroperoxides, particularly tertiary-butyl hydroperoxide. The peroxides should be employed in an amount dependent in part upon their ease of degradation but usually will be utilized in an amount between about 25 and 1000 millimoles of peroxide per 1000 grams of olefin copolymer.

The copper source utilized as co-catalysts in the subject degradation process include metallic copper as well as both insoluble classes such as cupric or cuprous halides on the one hand and soluble copper compounds such as cupric or cuprous carboxylates on the other. Typical copper compounds within each of these classes are given in the following lists:

Copper halides
  cuprous bromide
  cuprous chloride
  cuprous iodide
  cupric bromide
  cupric chloride
  cupric iodide Copper carboxylates
  cupric salts of mixed $C_{9-15}$ branched chain aliphatic carboxylic acids
  cupric p-(t-butyl)benzoate
  cupric acetate
  cupric naphthenate
  cupric t-butyrate While the broad concept of the invention contemplates the use of 0.1–5% by weight each of the materials, the amount will be adjusted dependent upon the other conditions of the process including the activity of the species employed, the extent of degradation desired and the temperature and time of the heat treatment in the presence of the co-catalyst. Usually the most practical proportions will be between about 0.2 and 1.5% by weight of each of the peroxide and copper compounds for a treatment time between about 2 and 12 hours.

The proportion of copper source utilized in the subject process is related to the amount of peroxide present, the molar ratio of peroxide to copper being between about 2 and 50, preferably between about 10 and 30.

The process of the invention is carried out at temperatures which will vary primarily with the stability of the peroxide involved. This will in turn depend upon the stability of the peroxide in the presence of the other components of the reaction mixture, principally the copper source. Furthermore, the temperature and time of degradation will depend also upon the original average molecular weight as measured by intrinsic viscosity of the polymer and the lower molecular weights desired following the treatment. Within the temperature range of 25–100° C., the degradation will require from about 1–24 hours. However, with many of the more suitable peroxides, it is more profitable to employ a temperature range between about 50° C. and 85° C. for a period of time between about 2 and 12 hours. The reaction is most easily controlled by selecting a solvent or solvent mixture for the original elastomer which refluxes within the desired temperature range. This not only closely controls the temperature of the reaction but also allows for recovery of heat in-put by heat exchange apparatus.

At the conclusion of the degradation process, the product comprises a solution of the degraded polymer in the inert solvent. This cement may be utilized as such but it is normally preferred to isolate and recover the degraded polymer and purify it of reaction products such as copper ions and the like by such treatment as ion exchange or suitable washing with water or dilute acids.

One of the essential features of the process is to carry out the degradation in the substantial absence of atmospheric oxygen. The presence of oxygen ($O_2$) during the reaction causes undesirable side reactions to occur, such as oxidation of the polymer chain and the like as well as consumption of copper for reactions not directly resulting in degradation of the chain. Consequently, it is desired to operate the process in the virtual absence of atmospheric oxygen in a closed vessel, the vapor space either being filled with vapors of the solvent employed in forming the original cement or protected by the introduction of an inert gas such as nitrogen or argon.

One of the unexpected features of the present invention is the discovery that the degraded product has virtually the same stereoconfiguration as that of the untreated high molecular weight elastomer. This is unexpected in that under many other conditions where degradation or peroxidation occurs, a marked degree of isomerization takes place at the same time, the product differing sharply from that of the starting material.

Based on this discovery the process has been found to be of exceptional value in the preparation of low molecular weight elastomers of conjugated dienes especially for the purpose of being blended with high molecular weight conjugated diene polymers and copolymers especially to improve their processability. Since the stereoconfiguration of the low molecular weight product of the present process is virtually the same as that of the starting material, it is therefore possible to create a composition comprising a high molecular weight conjugated diene elastomer of a given stereoconfiguration such as a relatively high cis 1,4-content and combine with it the product of the present process having a pre-determined stereoconfigurtaion, preferably of about the same stereoconfiguration as that of the high molecular weight component of the composition.

The product of the degradation reaction will have an average molecular weight as measured by its intrinsic viscosity in toluene at 25° C. of any degree lower than that of the starting material desired. Practically, the intrinsic viscosity of the product of the degradation reaction will be between about 0.1 and 1.5, more effectively between about 0.3 and 1.0. When employed in proportions of 5-30% by weight of the total composition, compounded with a conjugated diene elastomer having an intrinsic viscosity of 3-16, these products readily promote improved processability. Since they are of a pre-determined desired stereoconfiguration, they not only improve processability but do so without any expense in other properties of the elastomer.

The following examples illustrate the advantages gained by the process of the present invention:

A 2% solution of polyisoprene in benzene was treated with peroxides combined with a cupric salt of a mixture of branched chain monocarboxylic acids averaging 9 carbon atoms in the branched hydrocarbon chain. The table includes for comparison the intrinsic viscosity of the starting material together with its stereostructure and a second sample which has been treated with peroxide in the absence of the copper source. The treatment comprised refluxing for 7 hours in a nitrogen atmosphere. The following table summarizes the properties of the products concerned.

structure of the degraded product was essentially the same as that of the starting material.

We claim as our invention:

1. In the process for the reduction in average molecular weight of a diene polymer having an intrinsic viscosity between about 3 and 16 dl./g. in toluene at 25° C., the steps comprising:
    (1) forming a solution of the diene polymer in a non-hydrogen-donating hydrocarbon solvent;
    (2) admixing therewith 0.1–5% by weight each, based on the diene polymer, of a peroxide having the general configuration

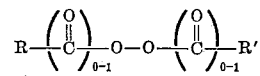

wherein R is a hydrocarbon radical and R' is a radical of the group consisting of hydrogen and hydrocarbyl, and copper, the copper being a copper source of the group consisting of copper metal, copper halides, copper carboxylates and mixtures thereof; the molar ratio of peroxide to copper source being between about 2 and 50;
    (3) heating the mixture so formed for 1–24 hours at 25–100° C. in the substantial absence of oxygen;
    (4) and recovering a diene polymer product having a substantially reduced intrinsic viscosity, the stereoconfiguration of the product beng essentially the same as that of the diene polymer prior to treatment.

2. In the process for the reduction in average molecular weight of a polyisoprene having an intrinsic viscosity between about 3 and 16 dl./g. in toluene at 25° C., the steps comprising:
    (1) forming a solution of the polyisoprene in a non-hydrogen-donating hydrocarbon solvent;
    (2) admixing therewith 0.1–5% by weight each, based on the polyisoprene, of a peroxide having the general configuration

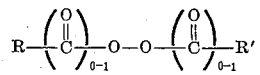

wherein R is a hydrocarbon radical and R' is a radical of the group consisting of hydrogen and hydrocarbyl, and copper, the latter being a copper source of the group consisting of metallic copper, copper halides, copper carboxylates and mixtures thereof; the molar ratio of peroxide to copper source being between about 2 and 50;
    (3) heating the mixture so formed for 1–24 hours at 25–100° C. in the substantial absence of oxygen;
    (4) and recovering a polyisoprene product having a substantially reduced intrinsic viscosity, the stereoconfiguration of the product being essentially the same as that of the polyisoprene prior to treatment.

3. A process according to claim 1 wherein the peroxide is an alkyl hydroperoxide.

4. A process according to claim 1 wherein the peroxide is an alkyl ester of a fatty peracid.

TABLE.—DEGRADATION OF HIGH CIS 1,4-POLYISOPRENE

| Run | Cu (mm.) | Peroxide (mm.) | IV (dl./g.) | Percent cis 1,4 | Percent 3,4 |
|---|---|---|---|---|---|
| A | (Control) | 0 | 0 | 7.27 | 93 | 7 |
| B | | 0.1 | tert-Butyl perbenzoate (1) | 2.62 | 93 | 7 |
| C | | 0.1 | tert-Butyl hydroperoxide (0.5) | 1.58 | 94 | 6 |
| D | | 0 | tert-Butyl hydroperoxide (0.1) | 6.35 | 92 | 8 |
| E | | 0.04 | tert-Butyl hydroperoxide (0.2) | 1.18 | 93 | 7 |
| F | | 0.02 | tert-Butyl hydroperoxie (0.1) | 1.67 | 93 | 7 |

According to the above data, it will be seen that the treatment with peroxide alone resulted in only an insignificant amount of degradation. On the other hand, the modification of the treatment system with copper salt in combination with peroxide resulted in substantial degradation to within the general area desired. It is also noteworthy according to the above table that the stereo- 5. A process according to claim 1 wherein the copper salt is a cuprous halide.

6. A process according to claim 1 wherein the copper carboxylate is a cupric salt of an aliphatic carboxylic acid.

7. A process according to claim 1 wherein the solvent is an aromatic hydrocarbon.

8. A process according to claim 1 wherein the solvents is a perhalocarbon.

9. A process according to claim 1 wherein the heat treatment is carried out for 2–12 hours at 50–85° C.

10. In the process for the reduction in average molecular weight of a polyisoprene having an intrinsic viscosity between about 4 and 12 dl./g. in toluene at 25° C., the steps comprising:
   (1) forming a solution of the polyisoprene in benzene;
   (2) admixing therewith 0.2–1.5% by weight each of tertiary butyl hydroperoxide and of copper, said copper being in the form of cupric salts of $C_{9-12}$ branched aliphatic monocarboxylic acids, based on the weight of polyisoprene;
   (3) heating the mixture so formed for 2–12 hours at benzene reflux temperature;
   (4) and recovering a polyisoprene product having a substantially reduced intrinsic viscosity, the stereoconfiguration of the product being essentially the same as that of the polyisoprene prior to treatment.

References Cited by the Examiner

UNITED STATES PATENTS

| | | | |
|---|---|---|---|
| 2,880,190 | 3/1959 | Gleason | 260—94.7 |
| 3,256,227 | 6/1966 | Kraus | 260—23.7 |

JOSEPH L. SCHOFER, *Primary Examiner.*

H. I. CANTOR, *Assistant Examiner.*